United States Patent
Otsuki

(10) Patent No.: US 7,295,679 B2
(45) Date of Patent: Nov. 13, 2007

(54) METHOD, APPARATUS, AND PROGRAM FOR IMAGE PROCESSING CAPABLE OF PREVENTING, DETECTING AND CORRECTING IMAGE ALTERATION, AND A MEDIUM STORING THE PROGRAM

(75) Inventor: Takashi Otsuki, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 694 days.

(21) Appl. No.: 10/858,959

(22) Filed: Jun. 2, 2004

(65) Prior Publication Data
US 2004/0247156 A1    Dec. 9, 2004

(30) Foreign Application Priority Data
Jun. 5, 2003    (JP)    ............... 2003-160405

(51) Int. Cl.
*G06K 9/00*    (2006.01)
(52) U.S. Cl. .................. 382/100; 382/232; 341/94; 380/201
(58) Field of Classification Search ................ 382/100, 382/112, 151, 168, 181, 232, 235, 237–248, 382/254, 274, 276, 305; 375/240.02; 713/176; 358/1.9; 380/54, 201; 341/50, 94
See application file for complete search history.

(56) References Cited

U.S. PATENT DOCUMENTS

| | | | | |
|---|---|---|---|---|
| 5,875,249 A * | 2/1999 | Mintzer et al. | ............... | 380/54 |
| 6,646,760 B1 * | 11/2003 | Hanihara | ............ | 358/1.9 |
| 6,678,390 B1 * | 1/2004 | Honsinger | ............ | 382/100 |
| 6,801,636 B2 * | 10/2004 | Murakami et al. | ............ | 382/100 |
| 6,895,101 B2 * | 5/2005 | Celik et al. | ............ | 382/100 |
| 6,931,534 B1 * | 8/2005 | Jandel et al. | ............ | 713/176 |
| 6,947,484 B2 * | 9/2005 | Inagaki et al. | ............ | 375/240.02 |
| 6,978,035 B2 * | 12/2005 | Kawaguchi et al. | ............ | 382/100 |
| 7,006,656 B2 * | 2/2006 | Fridrich et al. | ............ | 382/100 |

FOREIGN PATENT DOCUMENTS

JP    2001103281    4/2001

* cited by examiner

*Primary Examiner*—Seyed Azarian
(74) *Attorney, Agent, or Firm*—Cooper & Dunham, LLP

(57) ABSTRACT

A method, apparatus, and program for image processing are provided to perform operations for generating an encoded image, detecting image alteration on the encoded image, and regenerating an original image from the encoded image. The encoded image is generated by an encoding apparatus, which inserts a redundant code into an LSB (least significant bit) bit-plane of the original image. The redundant code can be generated based on bit-planes other than the LSB bit-plane, using a CRC (cyclic redundancy check) method. A decoding apparatus recalculates a redundant code from the encoded image, and checks validity of the encoded image based on the extracted redundant code.

64 Claims, 13 Drawing Sheets

FIG. 3
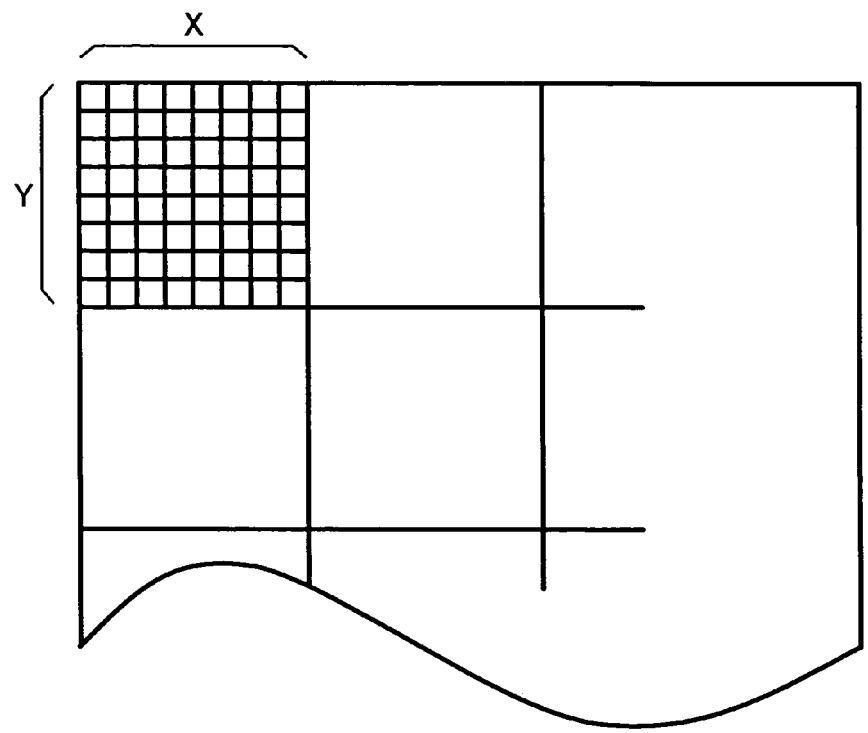
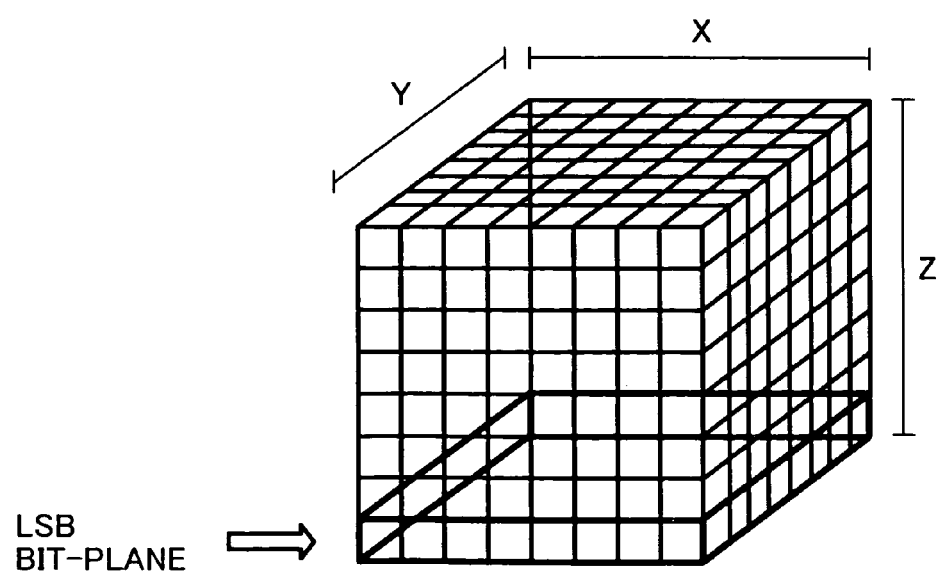
LSB BIT-PLANE ⇒

METHOD, APPARATUS, AND PROGRAM FOR IMAGE PROCESSING CAPABLE OF PREVENTING, DETECTING AND CORRECTING IMAGE ALTERATION, AND A MEDIUM STORING THE PROGRAM

BACKGROUND

1. Field

This specification relates to a method, apparatus and program for image processing, and more particularly to a method, apparatus, and program for image processing capable of preventing, detecting and correcting image alteration.

2. Discussion of the Background

Recently, with the increase in speed and capacity of an image forming processor, digital image data is easily processed, edited, or copied. In addition, such digital image data is easily transmitted through a communication line or viewed on a network. However, with the widespread use of digital image data comes a growing threat of image alteration, such as image tampering.

One approach for detecting image alteration is to incorporate an invisible watermark into an original image and then detect its presence in a suspected image copy. For example, one background watermarking technique divides an original document image into an arbitrary number of small blocks. For each block, the background technique embeds a watermark into an LSB (least significant bit) bit-plane of the image. To detect image alteration, a suspected image is divided into the arbitrary number of small blocks, and for each of the blocks, a watermark is extracted. In this case, alteration is detected where the extracted watermark does not match with the embedded watermark.

SUMMARY OF THE DISCLOSURE

This patent specification describes an apparatus, method, and related computer program product or medium, capable of preventing, detecting and correcting alteration of an original image.

In one example, an encoding apparatus includes a first memory, a counter, a second memory, a third memory, a polynomial generator, a code calculator, a fourth memory, an encoder, and a data generator. The first memory stores therein block data. The counter defines the position of the block data. The second memory is electrically connected to the first memory, and stores therein lower bit-plane data of the block data. The third memory is electrically connected to the first memory, and stores therein upper bit-plane data of the block data, which is obtained by subtracting the lower bit-plane data from the block data. The polynomial generator generates a generator polynomial. The code calculator is electrically connected to the third memory and to the polynomial generator, and generates redundant code data based on the upper bit-plane data, using the generator polynomial. The fourth memory is electrically connected to the code calculator and stores therein the redundant code data. The encoder is electrically connected to the second memory and to the code memory, and embeds the redundant code data into the lower bit-plane data to form encoded lower bit-plane data. The data generator is electrically connected to the third memory and to the encoder, and adds the encoded lower bit-plane data to the upper bit-plane data to form encoded block data.

In this case, the block data contains X pixels in a scanning direction, Y pixels in a subscanning direction, with each pixel having a Z-bit depth. For example, the block data may be expressed as an image of 8 pixels times 8 pixels, with each pixel containing 8 bits.

Further, the lower bit-plane data may include LSB bit-plane data. Alternatively, a selector may be additionally provided to select the LSB bit-plane data and bit-plane data adjacent to the LSB bit-plane data.

Furthermore, the code calculator may include a dividing circuit configured to generate a CRC (cyclic redundancy check) value. The CRC value may be used to generate the redundant code data.

In the above exemplary case, the structure of the dividing circuit may be previously set based on the generator polynomial. Alternatively, a register may be additionally provided to provide information to the polynomial generator, and the polynomial generator may generate a generator polynomial based on the information. The information may include at least a size of the block data, a desired level of robustness, and a desired level of image quality.

Further, the encoding apparatus may include a random number generator configured to generate a random number sequence, and a code arranger configured to arrange the redundant code data according to the random number sequence.

In another example, a decoding apparatus includes a first memory, a counter, a second memory, a third memory, a polynomial generator, a code calculator, a fourth memory, a comparator, a decoder, and a data generator. The first memory stores therein block data. The counter defines the position of the block data. The second memory stores therein lower bit-plane data of the block data. The third memory is electrically connected to the first memory and stores therein upper bit-plane data of the block data, which is obtained by subtracting the lower bit-plane data from the block data. The polynomial generator generates a generator polynomial. The code calculator is electrically connected to the third memory and to the polynomial generator, and generates redundant code data based on the upper bit-plane data, using the generator polynomial. The fourth memory is electrically connected to the code calculator, and stores therein the redundant code data. The comparator is electrically connected to the code memory and checks validity of the redundant code data. The decoder is electrically connected to the comparator and to the second memory, and extracts the redundant code data from the lower bit-plane data to form decoded lower bit-plane data. The data generator is electrically connected to the third memory and to the decoder, and adds the decoded lower bit-plane data to the upper bit-plane data to form decoded block data.

In this case, the block data contains X pixels in a scanning direction, Y pixels in a subscanning direction, with each pixel having a Z-bit depth. For example, the block data may be expressed as an image of 8 pixels times 8 pixels, with each pixel containing 8 bits.

Further, the lower bit-plane data may include LSB bit-plane data. Alternatively, a selector may be additionally provided to select the LSB bit-plane data and bit-plane data adjacent to the LSB bit-plane data.

Furthermore, the code calculator may include a dividing circuit configured to generate a CRC value. The CRC value may be used to generate the redundant code data.

In the above exemplary case, the structure of the dividing circuit may be previously set based on the generator polynomial.

Further, the comparator may check the validity of the redundant code data based on the CRC value.

Furthermore, the comparator may check the validity of the redundant code data based on the arrangement thereof. In such an exemplary case, a random number generator generates a random number sequence using a key provided from the outside, and a code arranger arranges the redundant code according to the random number sequence.

In addition to the encoding and decoding apparatuses just described above, the features described in the present disclosure may be implemented in an image processing apparatus, which has functions of the above-described encoding apparatus and decoding apparatus, an encoding method, a decoding method, an information processing method, an information processing system, a computer program product for performing at least one of the above methods, and a computer readable medium storing the computer program, as illustrated in the following description, without departing from the scope and spirit of the appended claims.

BRIEF DESCRIPTION OF THE DRAWINGS

A more complete appreciation of the disclosure and many of the attendant advantages thereof can more readily be obtained from the following detailed description with reference to the accompanying drawings, wherein:

FIG. 3 is an illustration of exemplary image data to be input to the encoding apparatus of FIG. 1;

DETAILED DESCRIPTION OF PREFERRED EMBODIMENTS

Figure 1:
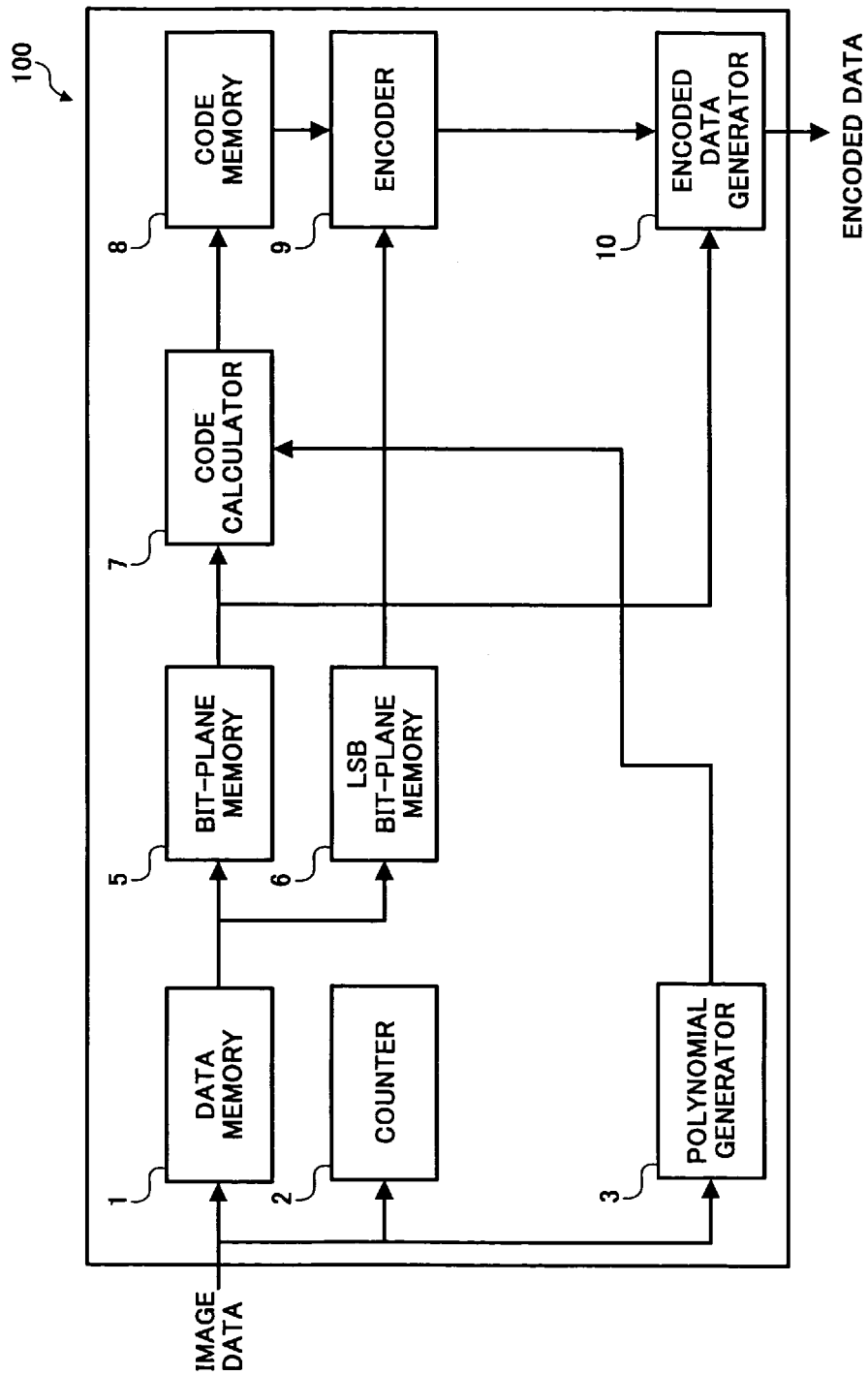
FIG. 1 is a block diagram illustrating an encoding apparatus according to a preferred embodiment of this disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an encoding apparatus 100 according to a preferred embodiment of this disclosure will be described below.

The encoding apparatus 100 generates an encoded image by embedding a redundant code into an original image, and includes a data memory 1, a counter 2, a polynomial generator 3, a bit-plane memory 5, an LSB bit-plane memory 6, a code calculator 7, a code memory 8, an encoder 9, and an encoded data generator 10. Each of the arrows in FIG. 1 shows data flow from one element to another element. In other words, each arrow indicates that there is an electrical (or logical) connection between the corresponding elements.

The data memory 1 inputs an original image. The counter 2 counts the number of pixels in the original image. The polynomial generator 3 generates a generator polynomial. The LSB bit-plane 6 stores therein an LSB bit-plane of the original image. The bit-plane memory 5 stores therein bit-planes other than the LSB bit-plane of the original image. The code calculator 7 calculates a redundant code. The code memory 8 stores therein the redundant code. The encoder 9 embeds the redundant code into the LSB bit-plane. The encoded data generator 10 generates an encoded image.

Figure 2:
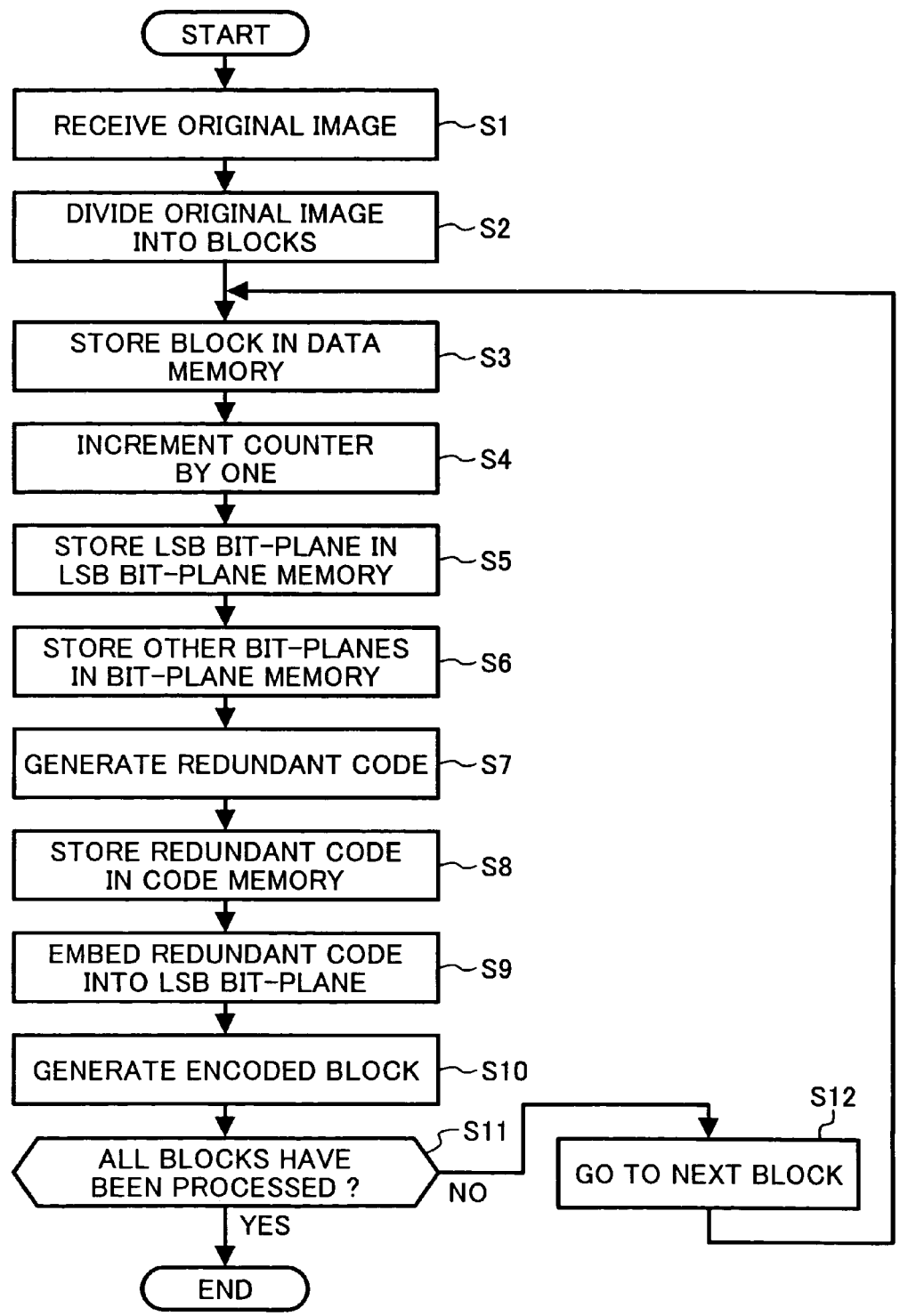
FIG. 2 is a flowchart illustrating a general encoding operation of the encoding apparatus shown in FIG. 1.

Referring now to FIG. 2, an exemplary encoding operation of the encoding apparatus 100 is explained.

In Step S1, the encoding apparatus 100 receives an original image from the outside. In this example, the original image may be any kind of a digital image, such as a multi-value image generated by a computer or a digital camera, a binary image generated by a computer or received from a scanner, and the like.

In Step S2, the encoding apparatus 100 divides the original image into a plurality of non-overlapping blocks each containing X pixels in a main scanning direction and Y pixels in a subscanning direction, with each pixel having a bit depth of Z, as illustrated in FIG. 3. The values of X, Y and Z are previously determined, for example, based on the size of the original image. For simplicity, FIG. 3 illustrates an exemplary case where the original image is divided into a plurality of blocks having X, Y, and Z values of 8, 8, and 8, respectively. Thus, as shown in FIG. 3, one block can be expressed as having eight bit-planes. In this example, the bit-planes are arranged in order from the MSB bit-plane being at the top to the LSB bit-plane being at the bottom.

In Step S3, the encoding apparatus 100 selects one block from the original image, and stores the selected block in the data memory 1. In this example, the encoding apparatus 100 selects blocks, one by one, from the upper left to the lower right of the original image. However, the encoding apparatus 100 may select blocks in another way, as long as all of the blocks in the original image can be finally selected.

In Step S4, the counter 2 is incremented by one such that the position of the selected block in the original image is defined.

In Step S5, the encoding apparatus 100 extracts the LSB bit-plane of the selected block, and stores it in the LSB bit-plane memory 6. In this example, the LSB bit-plane contains 64 bits, as illustrated in FIG. 3.

At the same time, in Step S6, the encoding apparatus 100 extracts the other bit-planes, and stores them in the bit-plane memory 5. Since each bit-plane contains 64 bits, the other bit-planes, including seven bit-planes, contain 448 bits in total, as illustrated in FIG. 3.

In Step S7, the polynomial generator 3 generates a generator polynomial based on the block size. More specifically, the generator polynomial 3 automatically selects a desired generator polynomial from a plurality of generator polynomials that have been previously stored therein. Subsequently, the code calculator 7 generates the redundant code based on the data contained in the other bit-planes, using the generator polynomial generated by the polynomial generator 3.

Then, in Step S8, the redundant code is stored in the code memory 8.

Figure 4:
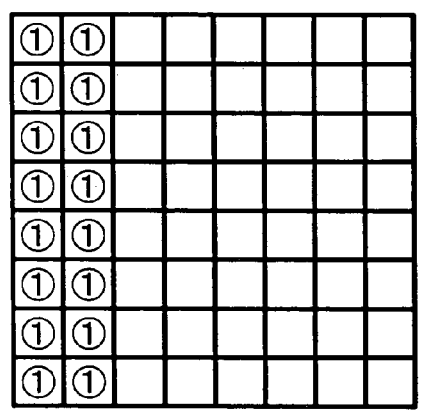
FIG. 4 is an illustration of exemplary encoded block data processed by the encoding apparatus of FIG. 1.

In Step S9, the encoder 9 embeds a predetermined number of the redundant codes into the LSB bit-plane, one bit by one bit, in a predetermined order. The predetermined number of the redundant codes and the predetermined order are previously set, according to various conditions, such as the original image size, the block size, a desired level of robustness, and a desired signal to noise ratio of the encoded image. FIG. 4 illustrates an exemplary case where 16 redundant codes are added from the upper left to the lower right of the LSB bit-plane. In FIG. 4, a marked area indicates the bits embedded with the redundant code, while an unmarked area indicates the bits in an original state.

In Step S10, the encoded data generator 10 adds the encoded LSB bit-plane to the other bit-planes stored in the bit-plane memory 5. The resultant block thus contains the predetermined number of redundant codes, which may be used for image alteration detection.

In Step S11 it is determined whether all of the blocks in the original image have been processed. If the answer is yes, the encoding apparatus 100 generates an encoded image, and the process ends. If the answer is no, the target moves to a next block in Step S12, and then repeats Steps S3 to S11. Specifically, in this example, the determination is made based on the position of the selected block, which has been previously determined in Step S4.

In Step S7, the redundant code is calculated by a CRC (cyclic redundancy check) method, which operates in the "modulo two" arithmetic. One way to perform such CRC calculation is to represent all of the binary values of input data, a redundant code, and encoded data as polynomials of a variable X, for example, as follows:

P(X)=input data polynomial;
C(X)=redundant code polynomial; and
E(X)=encoded data polynomial.

The redundant code polynomial C(X) can be obtained by dividing the input data polynomial P(X) by a generator polynomial G(X) previously defined, for example, as follows:

P(X)/G(X)=q(X)+r(X), where q(X) and r(X) correspond to the resultant quotient and remainder, respectively. Specifically, the remainder r(X), generally known as a checksum, is used as the redundant code polynomial C(X). Thus, the encoded data polynomial E(X) can be obtained by adding the redundant code polynomial C(X), i.e., r(X), to the input data polynomial P(X), as follows:

$$E(X)=P(X)+C(X).$$

As an example, let's assume the following:
$P(X)=1*X^6+1*X^5+0*X^4+1*X^3+1*X^2+0*X^1+1*X^0=X^6+X^5+X^3+X^2+1$; and
$G(X)=1*X^5+0*X^4+1*X^3+1*X^2+0*X^1+1=X^5+X^3+X^2+1$,
where all coefficients of X indicate the binary values of data located in respective locations.

To calculate the redundant code polynomial C(X), the input data polynomial P(X) is divided by the generator polynomial G(X) to give a remainder $r(X)=X^4+X^3+1$, which is equal to the redundant code polynomial C(X).

In another example, the input data polynomial P(X) may be first multiplied by the highest degree of the generator polynomial G(X), especially when the encoding apparatus 100 is performed on a network environment. In such a case, the above input data polynomial $P(X)=X^6+X^5+X^3+X^2+1$ is multiplied by $X^5$ to give the resultant polynomial $X^5$ P $(X)=X^{11}+X^{10}+X^8+X^7+X^5$. Then, the resultant polynomial $X^5$ P(X) is divided by the generator polynomial $G(X)=X^5+X^3+X^2+1$ to give the remainder $r(X)=X^{11}$, which is equal to the redundant code polynomial C(X). Thus, an encoded data polynomial $E(X)=X^5$ $P(X)+C(X)=(X^{11}+X^{10}+X^8+X^7+X^5)+X^{11}$ is generated.

Figure 5:
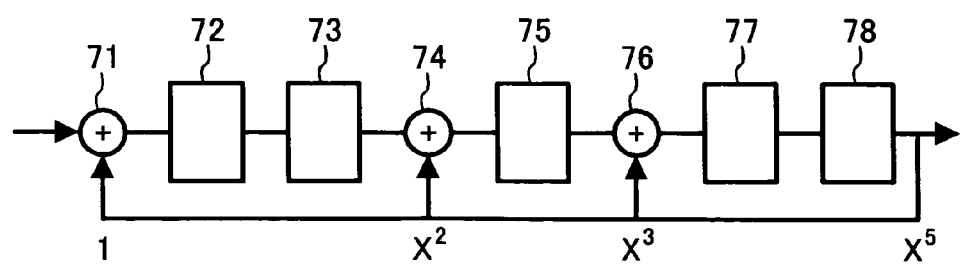
FIG. 5 is a block diagram illustrating a general structure of a code calculator shown in FIG. 1.

This CRC calculation is carried out by a dividing circuit included in the code calculator 7. As shown in FIG. 5, the dividing circuit includes a plurality of adders 71, 74 and 76, and a plurality of delay elements 72, 73, 75, 77 and 78. The dividing circuit of FIG. 5 has such a structure that it corresponds to the above exemplary generator polynomial $G(X)=X^5+X^3+X^2+1$. Once the CRC calculation is started, values in the delay elements are preset to 0. Then, a data sequence corresponding to the input data polynomial is entered and shifted, one bit at a time. The final value of the register is treated as the redundant code.

Figure 6:
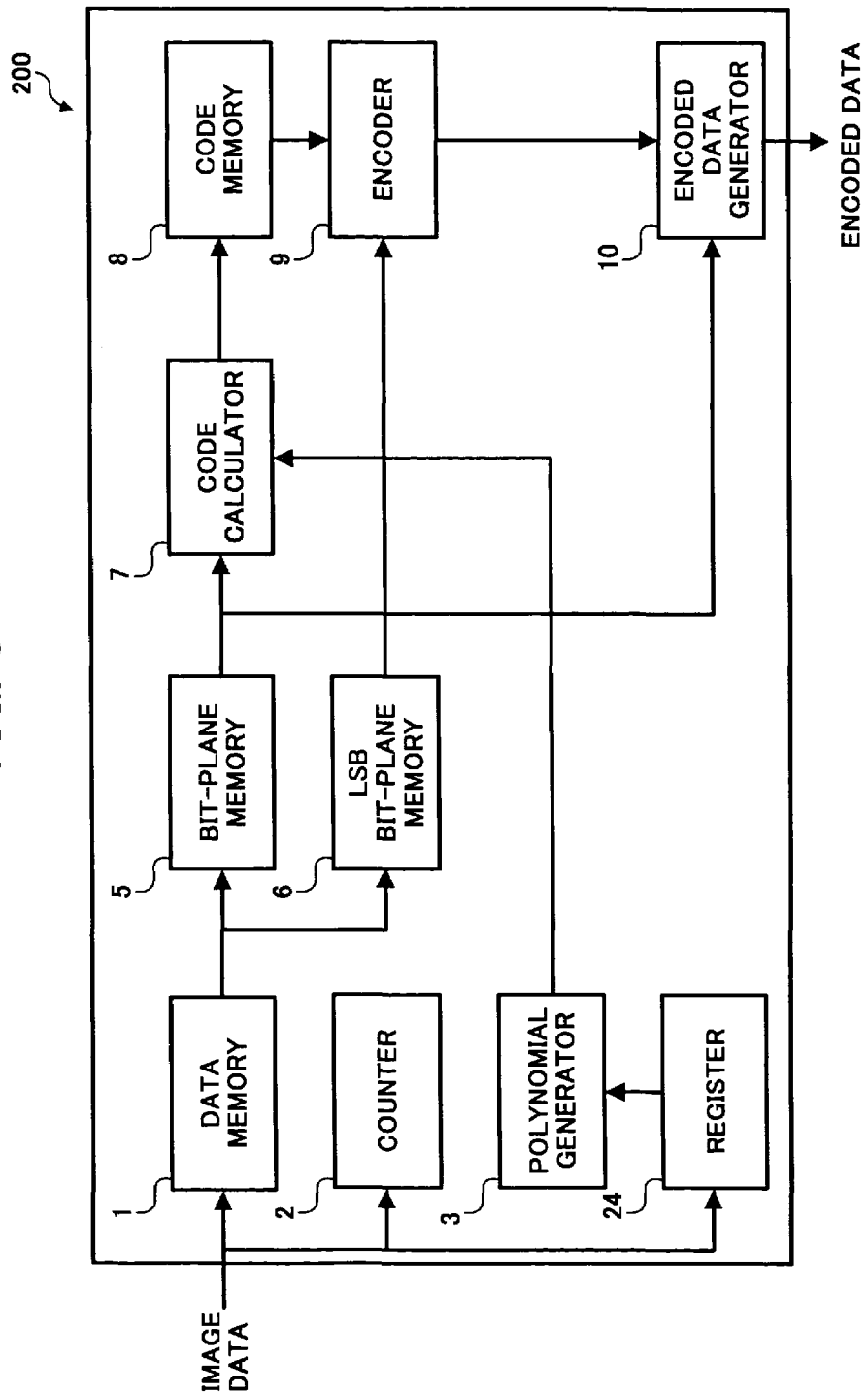
FIG. 6 is a block diagram illustrating an encoding apparatus according to another embodiment of this application.

Next, an encoding apparatus 200 according to another embodiment of the disclosure is explained, while referring to FIG. 6. The image processor 200 has a structure substantially similar to the structure of the encoding apparatus 100 of FIG. 1 except for a register 24 in addition. The register 24 is electrically connected to the polynomial generator 3 and the code calculator 7.

Figure 7:
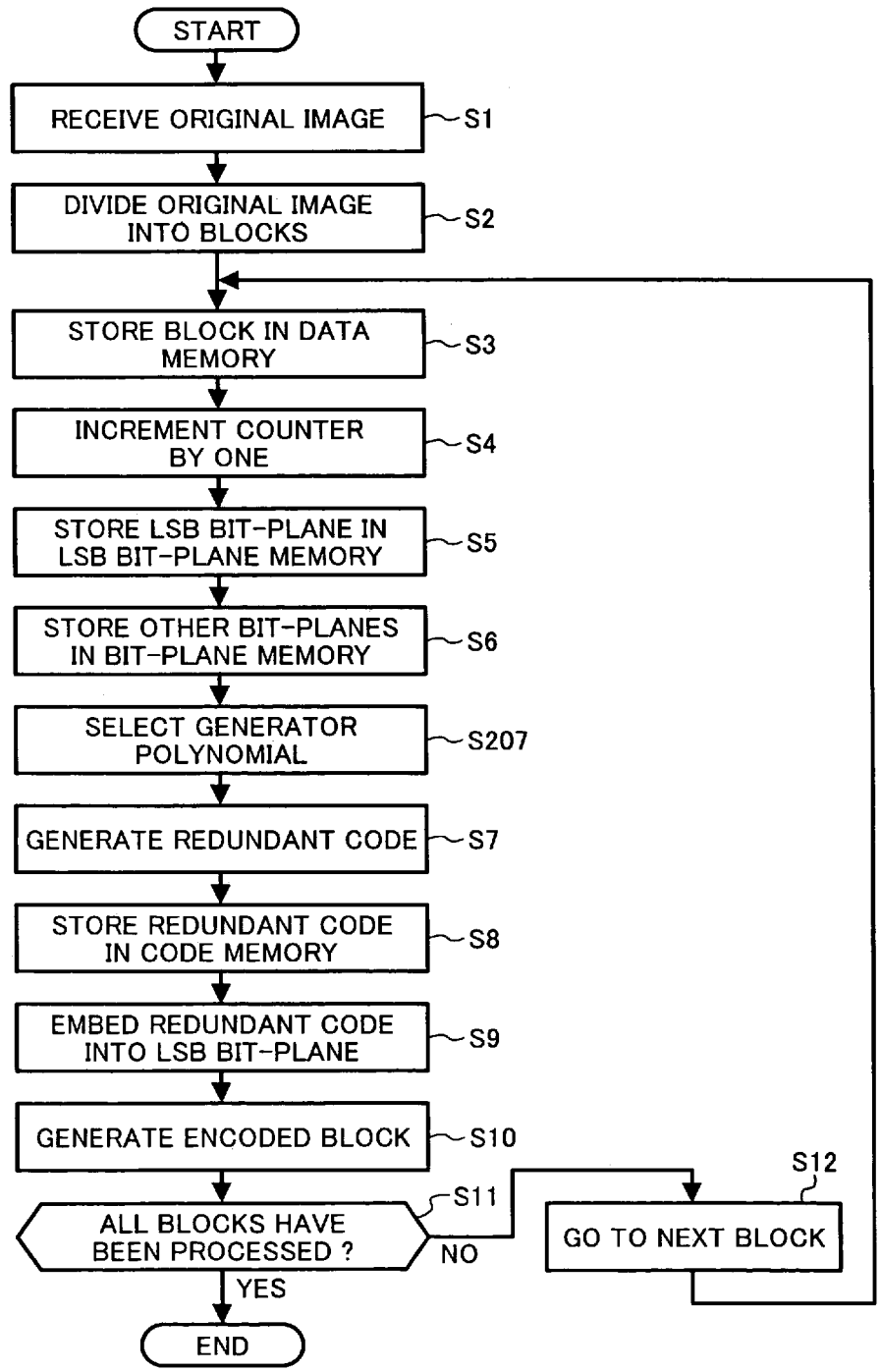
FIG. 7 is a flowchart illustrating a general encoding operation of the encoding apparatus shown in FIG. 6.

As shown in FIG. 7, a general encoding operation of the encoding apparatus 200 is substantially similar to that of the encoding apparatus 100, except for the addition of Step S207.

In Step S207, the polynomial generator 3 generates a generator polynomial based on information stored in the register 24. More specifically, as compared to the case of the encoding apparatus 100, which automatically sets a generator polynomial based on the block data size, the encoding apparatus 200 allows a user to control generation or selection of a generator polynomial. For example, if a larger block size or a higher robustness level is preferable, a user may set a generator polynomial of higher order. On the other hand, if a higher image quality is preferable, a user may set a generator polynomial of lower order. Depending on such information, a user may input a desired generator polynomial, or may select a suitable generator polynomial from a plurality of generator polynomials provided from the polynomial generator 3.

Figure 8:
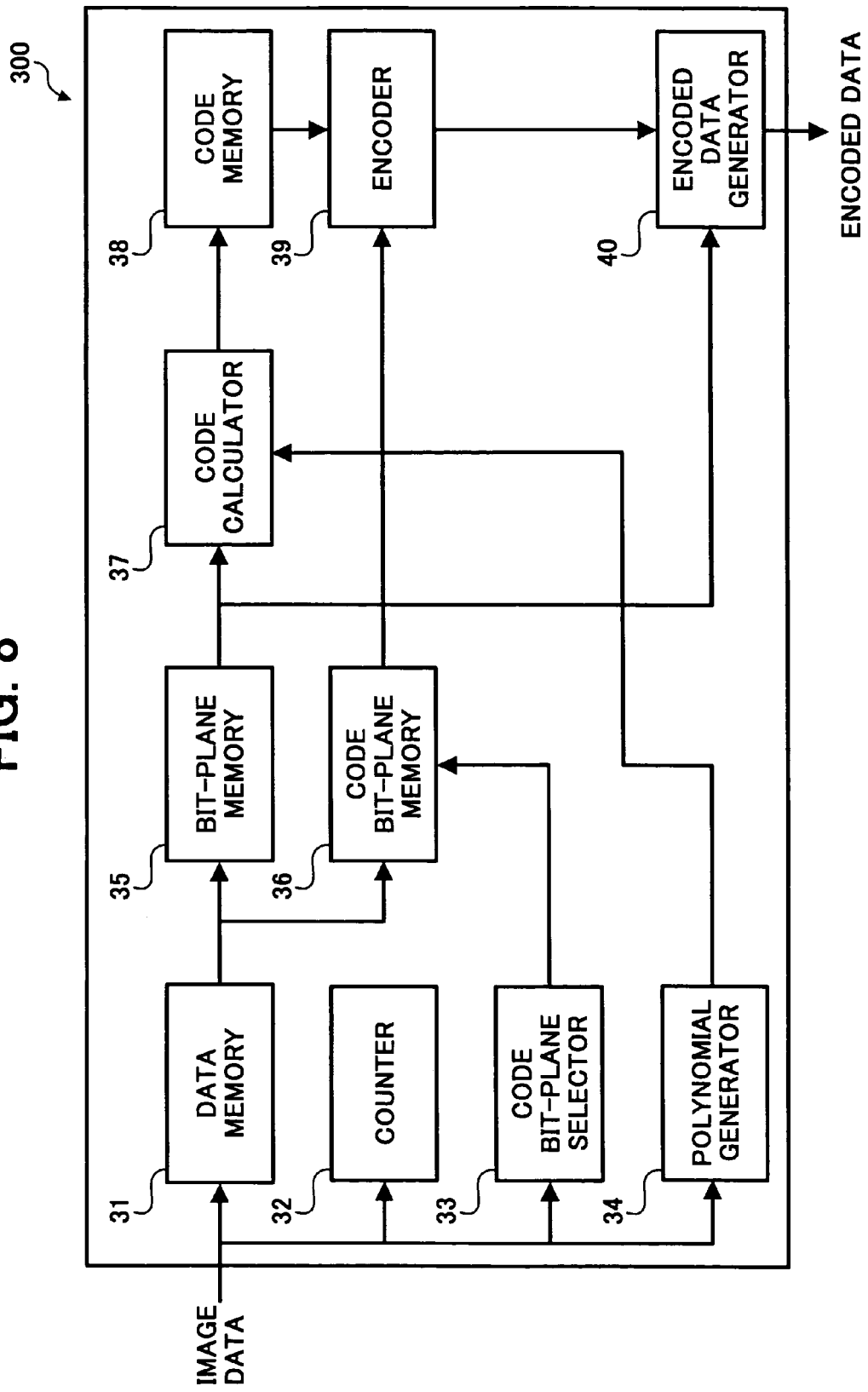
FIG. 8 is a block diagram illustrating an encoding apparatus according to another embodiment of this disclosure.

Next, an encoding apparatus 300 according to another embodiment of the present disclosure is explained, while referring to FIG. 8. The encoding apparatus 300 generates an encoded image by embedding a predetermined number of redundant codes in more than one bit-planes of an original image. Thus, the encoding apparatus 300 is preferably applicable to an original image of large size. As shown in FIG. 8, the encoding apparatus 300 includes a data memory 31, a counter 32, a code bit-plane selector 33, a polynomial generator 34, a bit-plane memory 35, a code bit-plane memory 36, a code calculator 37, a code memory 38, an encoder 39, and a data generator 40. Except for the newly added code bit-plane selector 33, all of the above elements are substantially similar in structure to the corresponding elements of FIG. 1, but they may be different in operation as described below.

Figure 9:
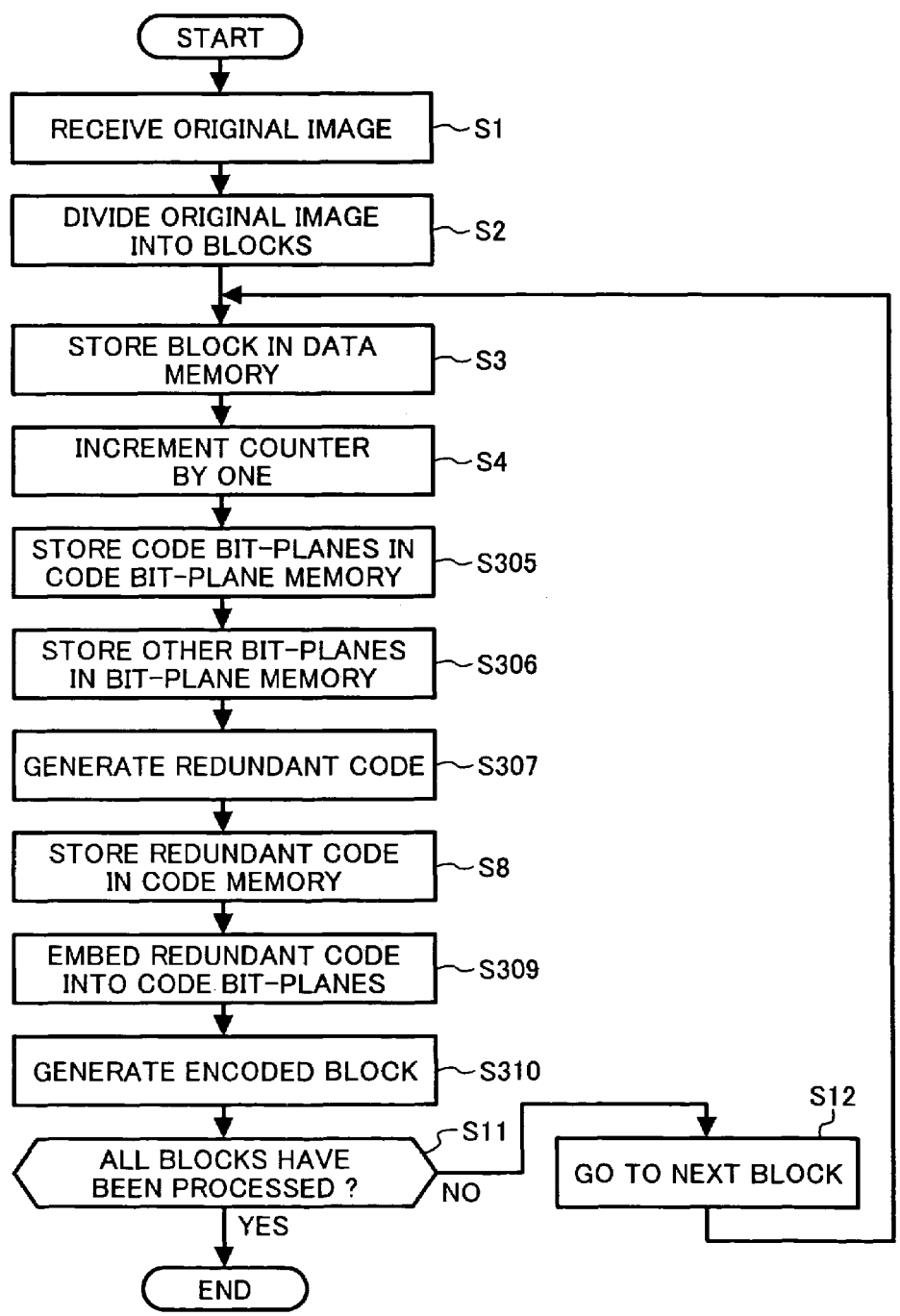
FIG. 9 is a flowchart illustrating a general encoding operation of the encoding apparatus shown in FIG. 8.

Referring now to FIG. 9, a general encoding operation of the encoding apparatus 300 is explained. Since the operation of FIG. 9 includes steps similar to the steps shown in FIG. 2, only steps that are different from the steps of FIG. 2 are described.

In Step S305, the code bit-plane selector 33 selects one or more lowest bit-planes of the selected block, and stores the selected lowest bit-planes in the code bit-plane memory 36. The number of bit-planes to be selected is determined based on the original image size. However, the two lowest bit-planes including the LSB are preferably selected for improved image quality.

In Step S306, the bit-plane memory 35 stores therein the bit-planes, of the selected block, other than the selected lowest bit-planes stored in the code bit-plane memory 36.

In Step S307, the code calculator 37 generates a redundant code based on the selected lowest bit-planes read out from the bit-plane memory 35.

In Step S309, the encoder 39 embeds a predetermined number of the redundant codes into the selected lowest bit-planes, one bit by one bit, in a predetermined order, as described with reference to Step S9 of FIG. 2.

In Step S310, the encoded data generator 40 adds the encoded lowest bit-planes to the other bit-planes stored in the bit-plane memory 35. If the number of the lowest bit-planes is two, two encoded lowest bit-planes are combined with the six other bit-planes.

Figure 10:
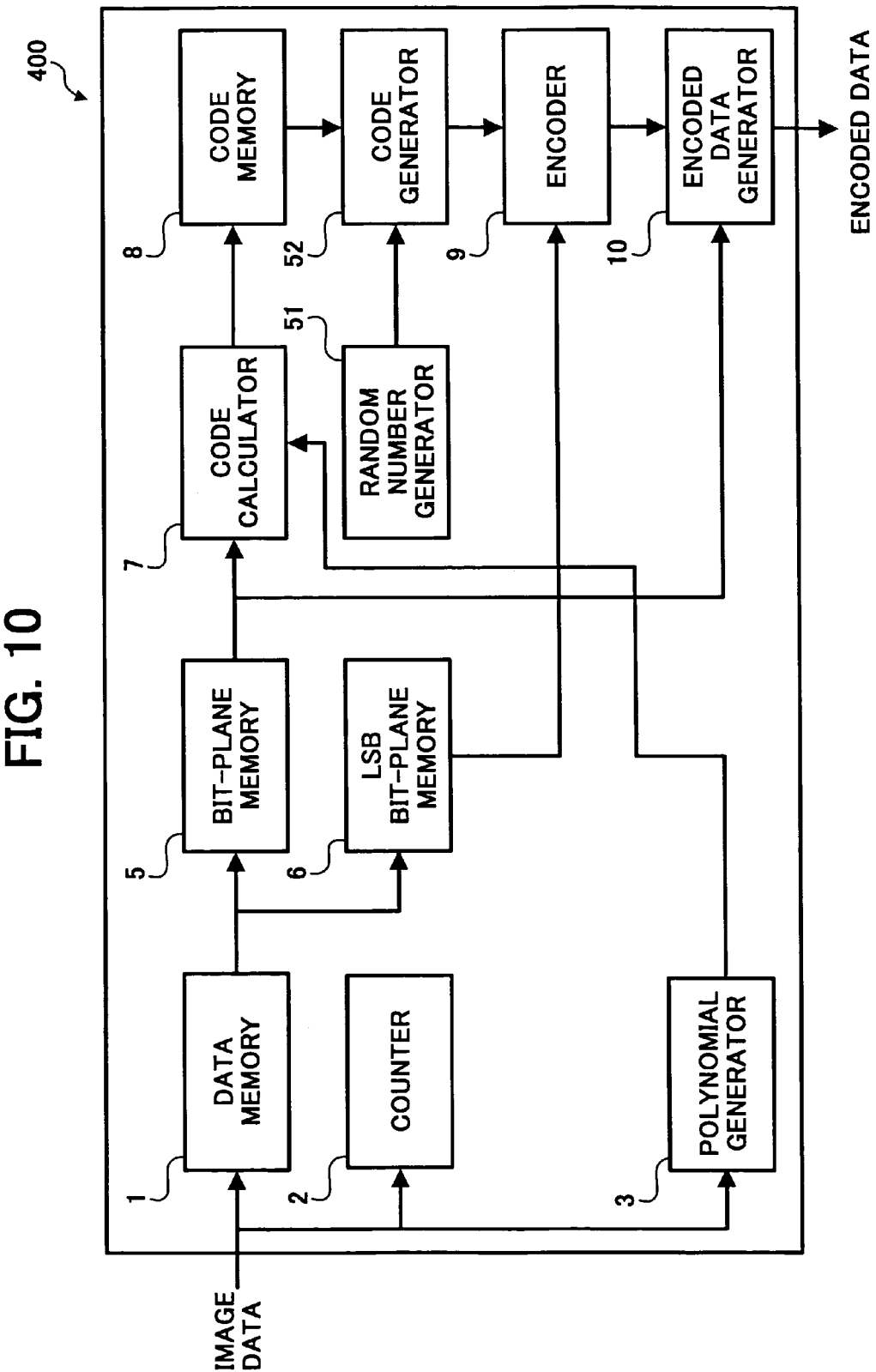
FIG. 10 is a block diagram illustrating an encoding apparatus according to another embodiment of this application.

Next, an encoding apparatus 400 according to another embodiment of this disclosure is explained, while referring to FIG. 10. The encoding apparatus 400 has a structure substantially similar to the structure of the encoding apparatus 100 of FIG. 1 except for the addition of a random number generator 51 and a code generator 52.

Figure 11:
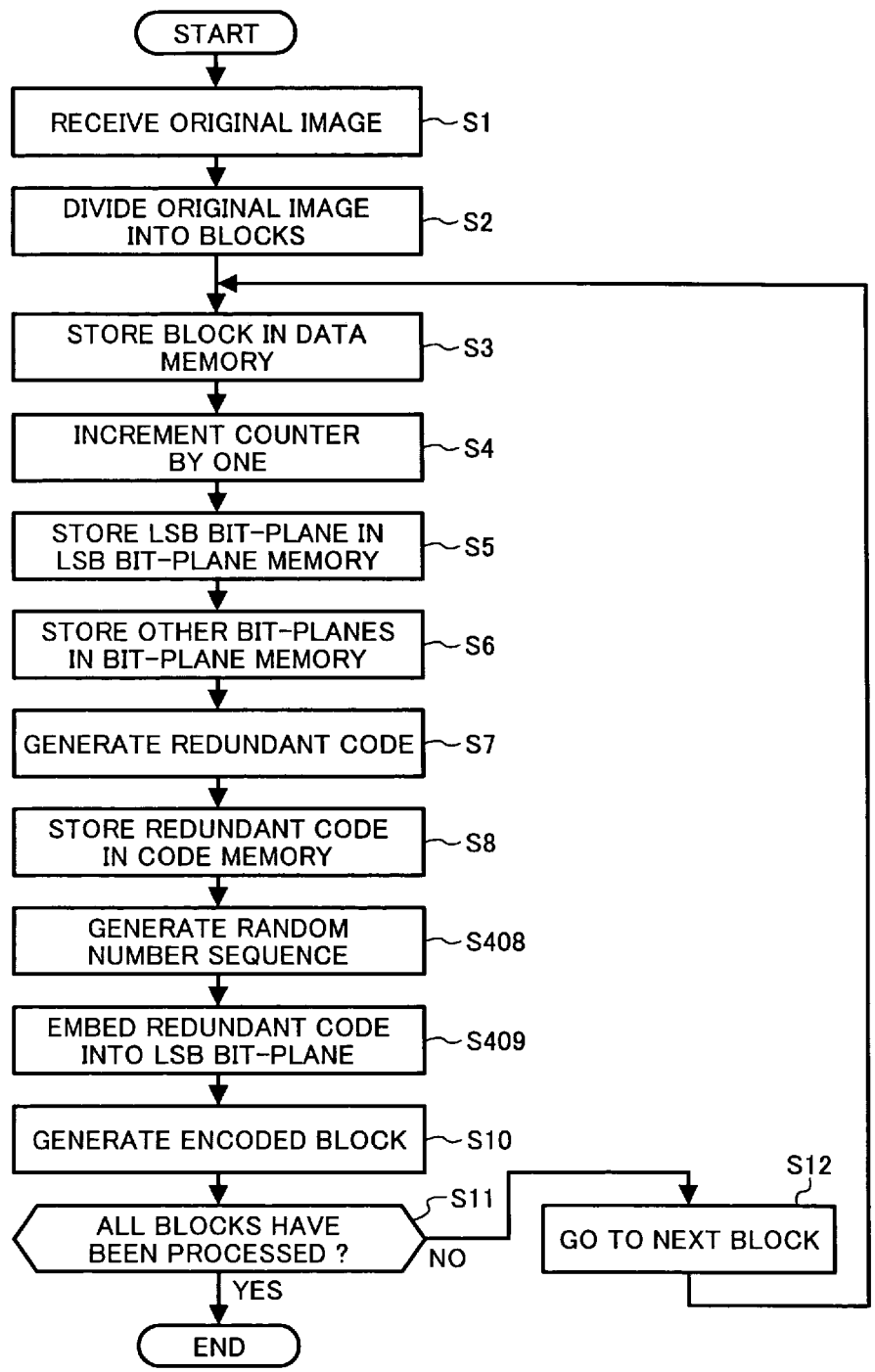
FIG. 11 is a flowchart illustrating a general encoding operation of the encoding apparatus shown FIG. 10.

As shown in FIG. 11, a general encoding operation of the encoding apparatus 400 is substantially similar to that of the encoding apparatus 100, except that Step S408 is added and Step 9 is replaced with Step S409.

In Step S408, the random number generator 51 generates a random number sequence, such as a pseudo-random binary sequence using a linear congruential method, for example.

Figure 12:
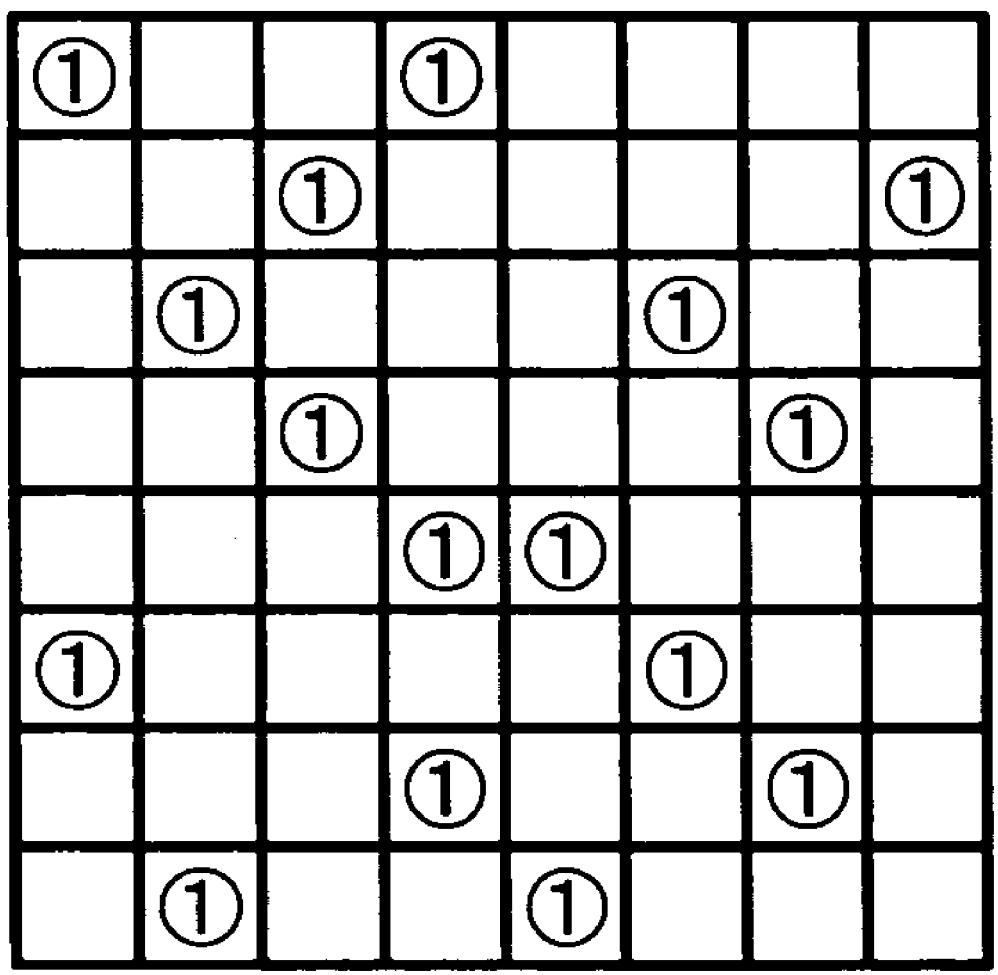
FIG. 12 is an illustration of exemplary encoded block data processed by the encoding apparatus of FIG. 10.

In Step S409, the code generator 52 reads out the redundant code from the code memory 8, and arranges a predetermined number of the redundant codes according to the random number sequence generated in Step S408. Subsequently, the encoder 9 embeds the arranged redundant codes into the LSB bit-plane, one bit by one bit. FIG. 12 illustrates an exemplary encoded block where 16 redundant codes are added according to a random number sequence. Compared with the encoded block shown in FIG. 4, the encoded block of FIG. 16 can provide more robustness.

Figure 13:
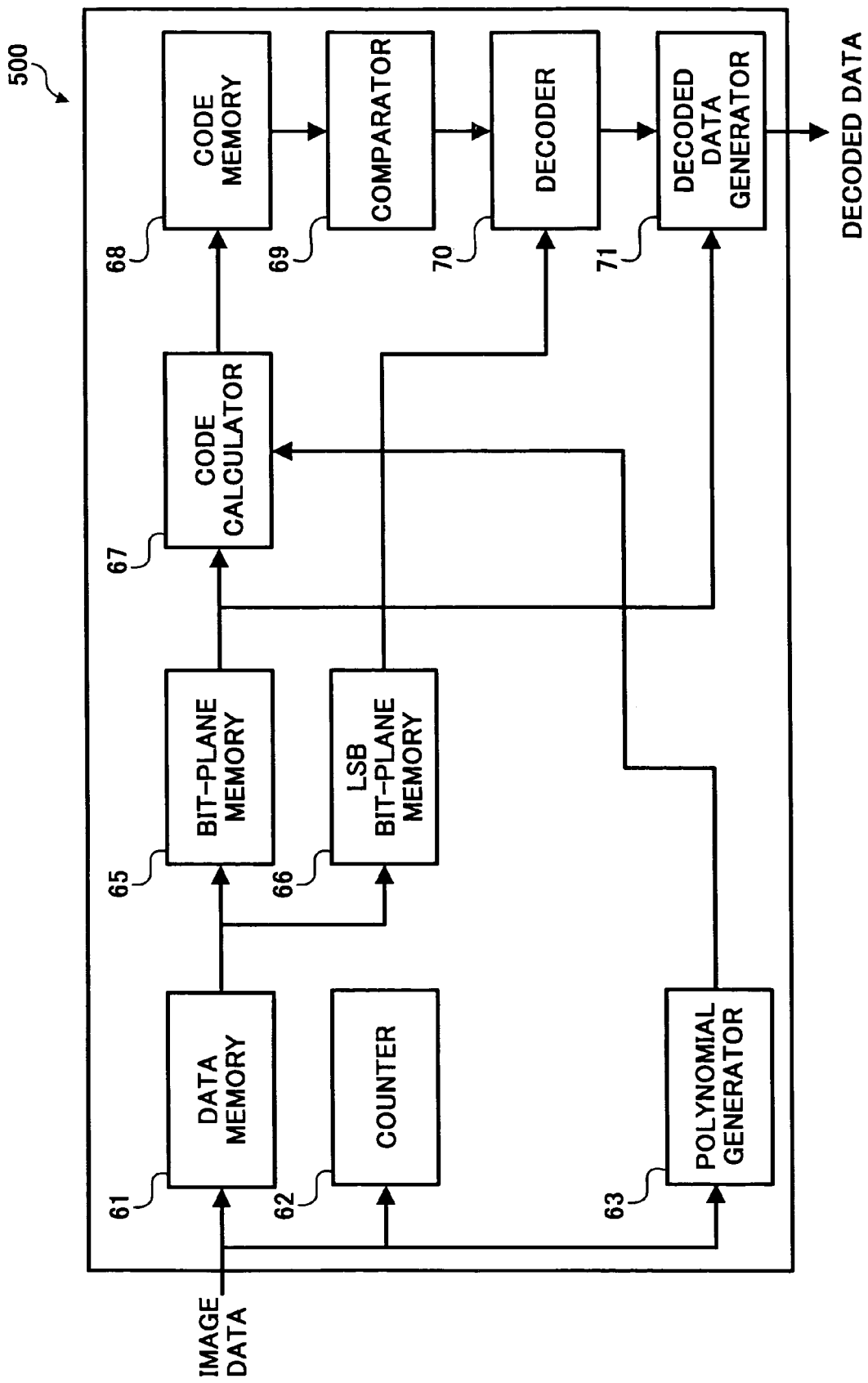
FIG. 13 is a block diagram illustrating a decoding apparatus according to another embodiment of this disclosure.

FIG. 13 illustrates a decoding apparatus 500, according to another embodiment of the present disclosure, which is used in combination with the encoding apparatus 100 of FIG. 1. The decoding apparatus 500 detects image alteration and, if alteration is detected, corrects an altered portion of the image.

As shown in FIG. 13, the decoding apparatus 500 includes a data memory 61, a counter 62, a polynomial generator 63, a bit-plane memory 65, an LSB bit-plane memory 66, a code calculator 67, a code memory 68, a comparator 69, a decoder 70, and a decoded data generator 71. Each of the arrows in FIG. 13 shows data flow from one element to another element. In other words, each arrow indicates that there is an electrical (or logical) connection between the corresponding elements.

The data memory 61 inputs an encoded image. The counter 62 counts the number of pixels in the encode image. The polynomial generator 63 stores therein a plurality of generator polynomials. The LSB bit-plane memory 66 stores therein an LSB bit-plane of the encoded image. The bit-plane memory 65 stores therein bit-planes other than the LSB bit-plane of the original image. The code calculator 67 calculates a redundant code. The code memory 68 stores therein the redundant code. The comparator 69 checks validity of the redundant code. The decoder 70 extracts the redundant code from the encoded image. The decoded data generator 71 generates a decoded image.

Figure 14:
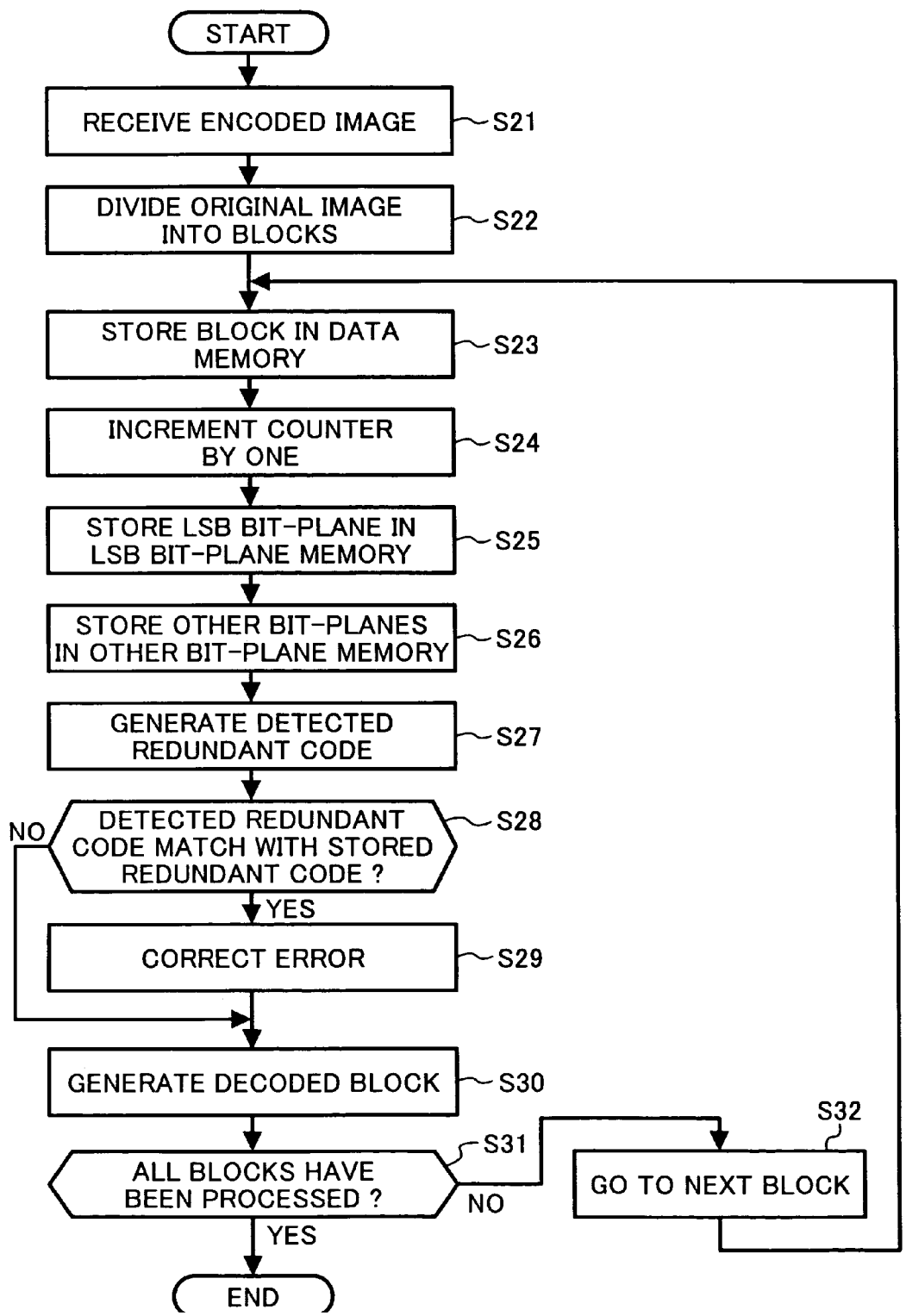
FIG. 14 is a flowchart illustrating general detecting and decoding operations of the decoding apparatus of FIG. 13.

Referring now to FIG. 14, an exemplary decoding operation of the decoding apparatus 500 is explained.

In Step S21, the decoding apparatus 500 receives an encoded image from the outside. In this case, it is previously known that the encoded image has been encoded with the encoding apparatus 100.

In Step S22, the decoding apparatus 500 divides the encoded image into a plurality of non-overlapping blocks each containing X pixels in a main scanning direction and Y pixels in a subscanning direction, with each pixel having a bit depth of Z. Specifically, values for X, Y and Z are previously determined in the encoding operation performed by the encoding apparatus 100. Therefore, in this example, X, Y and Z are 8, 8 and 8, respectively, as illustrated in FIG. 3.

In Step S23, the decoding apparatus 500 selects one block from the encoded image, and stores the selected block in the data memory 61. In this example, the encoding apparatus 500 selects blocks preferably in the order determined by the encoding operation of FIG. 2. However, the decoding apparatus 500 may select blocks in another way, as long as all of the blocks in the original image can be finally selected.

In Step S24, the counter 62 is incremented by one such that the position of the selected block in the original image is defined.

In Step S25, the decoding apparatus 500 extracts the LSB bit-plane of the selected block, and stores it in the LSB bit-plane memory 66.

In Step S26, the decoding apparatus 500 extracts the other bit-planes, and stores them in the bit-plane memory 65.

In Step S27, the code calculator 67 generates a detected redundant code based on data contained in the other bit-planes, using the generator polynomial that has been used in the encoding operation of FIG. 2. The detected redundant code is then stored in the code memory 68.

In Step S28, the comparator 69 determines whether the detected redundant code matches with the one that has been used in the encoding operation of FIG. 2. If the answer is yes, the comparator 69 determines the block as being altered, and the operation moves to Step S29. If the answer is no, the comparator 69 determines the block as being not altered, and the operation moves to Step S30.

In Step S29, the decoding apparatus 500 replaces the altered block with the original one, using one of conventional error correction methods, such as a backward error correction, a forward error correction, a Hamming code correction, and the like.

In Step S30, the decoder 70 extracts the redundant code from the encoded block to form a decoded block.

Step S31 determines whether all of the blocks in the encoded image have been processed. If the answer is yes, the decoding apparatus 50 generates a decoded image, and the process ends. If the answer is no, in Step S33, the target moves to a next block in Step S31, and then repeats Steps S23 to S30.

In Step S28, the encoded redundant code that has been used in the encoding operation may be read out from the code memory 68, if the code memory 68 functions as the code memory 8 of FIG. 1. Alternatively, the decoding apparatus 500 may recalculate the encoded redundant code using the original image, in a similar manner as described in FIG. 2, if the original image is provided.

In this example, CRC calculation is preferably used to determine whether the detected redundant code matches with the encoded redundant code. For example, a received data polynomial R(X) that has been received by a decoding apparatus 500 can be divided by the generator polynomial G(X) to see if the division provides any remainder. If the division provides no remainder, i.e, the checksum equals to 0, it is determined that the received data polynomial R(X) is identical with the encoded data polynomial E(X) that has been encoded by the encoding apparatus 100. On the other hand, if the division provides a remainder, it is determined that the received data polynomial R(X) does not match the encoded data polynomial E(X).

In addition to the decoding apparatus 500 described above, a decoding apparatus of various forms may be applied, depending on the type of an encoding apparatus that has been used to generate an encoded image.

For example, if the encoded image has been encoded by the encoding apparatus 200, a generator polynomial generated based on information stored in the register 24 of FIG. 6 is used for image alteration detection.

If the encoded image has been encoded by the encoding apparatus 300, a code bit-plane selector is additionally provided in the decoding apparatus 500. In this case, the code bit-plane selector selects the bit-planes to be used for the CRC calculation, in a similar manner as described in FIG. 9.

If the encoded image has been encoded by the encoding apparatus 400, a random number generator and a code generator are additionally provided in the decoding apparatus 500. In this case, a method or algorithm defined in the encoding operation for generating a random number sequence may be provided as a key, such as a public or private key. Using this key, the random number generator can generate a random number sequence similar to the one generated in the encoding operation of FIG. 11.

Numerous additional modifications and variations are possible in light of the above teachings. It is therefore to be understood that within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims.

Furthermore, the above-described CRC calculation is provided for the purpose of description. Thus, any polynomial used in this specification, including the generator polynomial G(X), for example, should be treated as an example.

This specification may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The apparatuses, methods, etc. of present disclosure may also be implemented by the preparation of application specific integrated circuits or by interconnecting an appropriate network of conventional component circuits, as will be readily apparent to those skilled in the art.

This patent specification is based on Japanese patent application No. JPAP2003-160405 filed on Jun. 5, 2003, in the Japanese Patent Office, the entire contents of which are incorporated by reference herein.

What is claimed is:

1. An encoding apparatus comprising:
a first memory configured to store therein block data;
a counter configured to define a position of the block data;
a second memory connected to the first memory and configured to store therein lower bit-plane data of the block data;
a third memory connected to the first memory and configured to store therein upper bit-plane data of the block data, which is obtained by subtracting the lower bit-plane data from the block data;
a polynomial generator configured to generate a generator polynomial;
a code calculator connected to the third memory and to the polynomial generator, and configured to generate redundant code data based on the upper bit-plane data, using the generator polynomial;
a fourth memory connected to the code calculator and configured to store therein the redundant code data;
an encoder connected to the second memory and to the fourth memory, and configured to embed the redundant code data into the lower bit-plane data to form encoded lower bit-plane data; and
a data generator connected to the third memory and to the encoder, and configured to add the encoded lower bit-plane data to the upper bit-plane data to form encoded block data.

2. The encoding apparatus of claim 1, wherein the block data contains X pixels in a scanning direction, Y pixels in a subscanning direction, with each pixel having a Z-bit depth.

3. The encoding apparatus of claim 2, wherein the values of X, Y, and Z are 8, 8, and 8, respectively.

4. The encoding apparatus of claim 1, wherein the lower bit-plane data includes LSB (least significant bit) bit-plane data.

5. The encoding apparatus of claim 1, wherein the code calculator comprises a dividing circuit configured to generate a CRC (cyclic redundancy check) value, and the code calculator generates the redundant code data based on the CRC value.

6. The encoding apparatus of claim 5, wherein a structure of the dividing circuit is set based on the generator polynomial.

7. The encoding apparatus of claim 1, further comprising a register connected to the polynomial generator and to the code calculator, and configured to provide information to the polynomial generator,
wherein the polynomial generator is generated based on the information provided by the register.

8. The encoding apparatus of claim 7, wherein the information provided by the register includes at least a size of the block data, a desired level of robustness, and a desired level of image quality.

9. The encoding apparatus of claim 1, further comprising a selector connected to the second memory and configured to select the lower bit-plane data.

10. The encoding apparatus of claim 9, wherein the lower bit-plane data includes LSB bit-plane data.

11. The encoding apparatus of claim 9, wherein the lower bit-plane data includes LSB bit-plane data and bit-plane data adjacent to the LSB bit-plane data.

12. The encoding apparatus of claim 1, further comprising:
a random number generator configure to generate a random number sequence; and
a code arranger configured to arrange the redundant code data according to the random number sequence.

13. A decoding apparatus comprising:
- a first memory configured to store therein block data;
- a counter configured to define a position of the block data;
- a second memory connected to the first memory and configured to store therein lower bit-plane data of the block data;
- a third memory connected to the first memory and configured to store therein upper bit-plane data of the block data, which is obtained by subtracting the lower bit-plane data from the block data;
- a polynomial generator configured to generate a generator polynomial;
- a code calculator connected to the third memory and to the polynomial generator, and configured to generate redundant code data based on the upper bit-plane data, using the generator polynomial;
- a fourth memory connected to the code calculator and configured to store therein the redundant code data;
- a comparator connected to the fourth memory and configured to check validity of the redundant code data;
- a decoder connected to the comparator and to the second memory, and configured to extract the redundant code data from the lower bit-plane data to form decoded lower bit-plane data; and
- a data generator connected to the third memory and to the decoder, and configured to add the decoded lower bit-plane data to the upper bit-plane data to form decoded block data.

14. The decoding apparatus of claim 13, wherein the block data contains X pixels in a scanning direction, Y pixels in a subscanning direction, with each pixel having a Z-bit depth.

15. The decoding apparatus of claim 14, wherein the values of X, Y, and Z are 8, 8, and 8, respectively.

16. The decoding apparatus of claim 13, wherein the lower bit-plane data includes LSB bit-plane data.

17. The decoding apparatus of claim 13, wherein the lowest bit-plane data includes LSB bit-plane data and bit-plane data adjacent to the LSB bit-plane data.

18. The decoding apparatus of claim 13, wherein the code calculator comprises a dividing circuit configured to generate a CRC value, and the code calculator generates the redundant code data based on the CRC value.

19. The decoding apparatus of claim 18, wherein a structure of the dividing circuit is set based on the generator polynomial.

20. The decoding apparatus of claim 18, wherein the comparator checks the validity of the redundant code data based on the CRC value.

21. The decoding apparatus of claim 13, further comprising:
- a random number generator configure to receive a key and generate a random number sequence using the key; and
- a code arranger configured to arrange the redundant code data according to the random number sequence,
- wherein the comparator checks the validity of the redundant code data based on the arrangement thereof.

22. An image processing apparatus comprising:
- a first memory configured to store therein block data;
- a counter configured to define a position of the block data;
- a second memory connected to the first memory and configured to store therein lower bit-plane data of the block data;
- a third memory connected to the first memory and configured to store therein upper bit-plane data of the block data, which is obtained by subtracting the lower bit-plane data from the block data;
- a polynomial generator configured to generate a generator polynomial;
- a code calculator connected to the third memory and to the polynomial generator, and configured to generate redundant code data based on the upper bit-plane data, using the generator polynomial;
- a fourth memory connected to the code calculator and configured to store therein the redundant code data;
- an encoder connected to the second memory and to the fourth memory, and configured to embed the redundant code data into the lower bit-plane data to form encoded lower bit-plane data;
- a comparator connected to the code memory and configured to check validity of the redundant code data;
- a decoder connected to the comparator and to the second memory, and configured to extract the redundant code data from the encoded lower bit-plane data; and
- a data generator connected to the third memory, to the encoder, and to the decoder, and configured to form the encoded and decoded block data.

23. The image processing apparatus of claim 22, wherein the block data contains X pixels in a scanning direction, Y pixels in a subscanning direction, with each pixel having a Z-bit depth.

24. The image processing apparatus of claim 23, wherein the values of X, Y, and Z are 8, 8, and 8, respectively.

25. The image processing apparatus of claim 22, wherein the lower bit-plane data includes LSB bit-plane data.

26. The image processing apparatus of claim 22, wherein the code calculator comprises a dividing circuit configured to generate a CRC value, and the code calculator generates the redundant code data based on the CRC value.

27. The image processing apparatus of claim 26, wherein a structure of the dividing circuit is set based on the generator polynomial.

28. The image processing apparatus of claim 22, further comprising:
- a register connected to the polynomial generator and to the code calculator, and configured to provide information to the polynomial generator,
- wherein the generator polynomial is generated based on the information provided by the register.

29. The image processing apparatus of claim 28, wherein the information provided by the register includes at least a size of the block data, a desired level of robustness, and a desired level of image quality.

30. The image processing apparatus of claim 22, further comprising a selector connected to the second memory and configured to select the lower bit-plane data.

31. The image processing apparatus of claim 30, wherein the lower bit-plane data includes LSB bit-plane data.

32. The image processing apparatus of claim 30, wherein the lower bit-plane data includes LSB bit-plane data and bit-plane data adjacent to the LSB bit-plane data.

33. The image processing apparatus of claim 22, further comprising:
- a random number generator configure to generate a random number sequence; and
- a code arranger configured to arrange the redundant code data according to the random number sequence.

34. The image processing apparatus of claim 26, wherein the comparator checks the validity of the redundant code data based on the CRC value.

35. The image processing apparatus of claim 33, wherein the comparator receives a key, and checks the validity of the redundant code data based on the arrangement of the redundant code data, using the key.

36. An encoding apparatus comprising:
  means for extracting block data from an original image;
  first storing means for storing the block data;
  means for finding a position of the block data;
  second storing means for storing lower bit-plane data of the block data;
  third storing means for storing upper bit-plane data of the block data, which is obtained by subtracting the lower bit-plane data from the block data;
  first providing means for providing a generator polynomial;
  first generating means for generating redundant code data based on the upper bit-plane data, using the generator polynomial;
  fourth storing means for storing the redundant code data;
  embedding means for embedding the redundant code data into the lower bit-plane data to form encoded lower bit-plane data;
  means for adding the encoded lower bit-plane data to the upper bit-plane data to form encoded block data; and
  means for combining the encoded block data to form an encoded image.

37. The encoding apparatus of claim 36, wherein the block data contains X pixels in a scanning direction, Y pixels in a subscanning direction, with each pixel having a Z-bit depth.

38. The encoding apparatus of claim 37, wherein the values of X, Y, and Z are 8, 8, and 8, respectively.

39. The encoding apparatus of claim 36, wherein the lower bit-plane data includes LSB bit-plane data.

40. The encoding apparatus of claim 36, further comprising calculating means for calculating a CRC (cyclic redundancy check) value,
  wherein the first generating means generates the redundant code data based on the CRC value.

41. The encoding apparatus of claim 39, wherein a structure of the calculating means is set based on the generator polynomial.

42. The encoding apparatus of claim 36, further comprising second providing means for providing information to the first providing means,
  wherein the generator polynomial is set based on the information provided by the second providing means.

43. The encoding apparatus of claim 41, wherein the information provided by the second providing means includes at least a size of the block data, a desired level of robustness, and a desired level of image quality.

44. The encoding apparatus of claim 36, further comprising means for selecting the lower bit-plane data.

45. The encoding apparatus of claim 43, wherein the lower bit-plane data includes LSB bit-plane data.

46. The encoding apparatus of claim 43, wherein the lowest bit-plane data includes LSB bit-plane data and bit-plane data adjacent to the LSB bit-plane data.

47. The encoding apparatus of claim 36, further comprising:
  second generating means for generating a random number sequence; and
  means for arranging the redundant code data according to the random number sequence.

48. A decoding apparatus comprising:
  means for selecting block data from an encoded image;
  first storing means for storing the block data;
  means for finding a position of the block data;
  second storing means for storing lower bit-plane data of the block data;
  third storing means for storing upper bit-plane data of the block data, which is obtained by subtracting the lower bit-plane data from the block data;
  first providing means for providing a generator polynomial;
  first generating means for generating redundant code data based on the upper bit-plane data, using the generator polynomial;
  fourth storing means for storing the redundant code data;
  checking means for checking validity of the redundant code data;
  means for extracting the redundant code data from the lower bit-plane data to form decoded lower bit-plane data;
  means for adding the decoded lower bit-plane data to the upper bit-plane data to form decoded block data; and
  means for combining the decoded block data to form a decoded image.

49. The decoding apparatus of claim 48, wherein the block data contains X pixels in a scanning direction, Y pixels in a subscanning direction, with each pixel having a Z-bit depth.

50. The decoding apparatus of claim 49, wherein the values of X, Y, and Z are 8, 8, and 8, respectively.

51. The decoding apparatus of claim 48, wherein the lower bit-plane data includes LSB bit-plane data.

52. The decoding apparatus of claim 48, wherein the lowest bit-plane data includes LSB bit-plane data and bit-plane data adjacent to the LSB bit-plane data.

53. The decoding apparatus of claim 48, further comprising means for calculating a CRC value,
  wherein the first generating means generates the redundant code data based on the CRC value.

54. The decoding apparatus of claim 53, wherein the checking means checks the validity of the redundant code data based on the CRC value.

55. The decoding apparatus of claim 4.8, further comprising:
  second generating means for receiving a key and generating a random number sequence using the key; and
  means for arranging the redundant code data according to the random number sequence,
  wherein the checking means checks the validity of the redundant code data based on the arrangement thereof.

56. An image processing method, comprising the steps of:
  reading block data, one by one, from an original image;
  defining a position of the block data;
  extracting lower bit-plane data from the block data;
  extracting upper bit-plane data, which is obtained by subtracting the lower bit-plane data from the block data, form the block data;
  providing a generator polynomial;
  generating redundant code data based on the upper bit-plane data, using the generator polynomial;
  forming encoded lower bit-plane data, in which the redundant code data is embedded; and
  creating encoded block data, in which the encoded lower bit-plane data and the upper bit-plane data are combined;
  checking validity of the redundant code data;
  forming decoded lower bit-plane data, from which the redundant code data is extracted; and
  creating decoded block data, in which the decoded lower bit-plane data and the upper bit-plane data are combined.

57. The image processing method of claim 56, further comprising the steps of:
  generating a random number sequence; and
  arranging the redundant code data according to the random number sequence.

58. The image processing method of claim 56, further comprising the step of correcting invalid block data based on the result of the validity checking step.

59. A computer program product stored on a computer readable storage medium for carrying out an image processing method, when run on an image processing apparatus, the method comprising the steps of:
  reading block data, one by one, from an original image;
  defining a position of the block data;
  extracting lower bit-plane data from the block data;
  extracting upper bit-plane data, which is obtained by subtracting the lower bit-plane data from the block data, form the block data;
  providing a generator polynomial;
  generating redundant code data based on the upper bit-plane data, using the generator polynomial;
  forming encoded lower bit-plane data, in which the redundant code data is embedded; and
  creating encoded block data, in which the encoded lower bit-plane data and the upper bit-plane data are combined;
  checking validity of the redundant code data;
  forming decoded lower bit-plane data, from which the redundant code data is extracted; and
  creating decoded block data, in which the decoded lower bit-plane data and the upper bit-plane data are combined.

60. The product of claim 59, wherein the method further comprises the steps of:
  generating a random number sequence; and
  arranging the redundant code data according to the random number sequence.

61. The product of claim 59, wherein the method further comprises the step of correcting invalid block data based on the result of the validity checking step.

62. A computer readable medium storing computer instructions for performing an image processing method, the method comprising the steps of:
  reading block data, one by one, from an original image;
  defining a position of the block data;
  extracting lower bit-plane data from the block data;
  extracting upper bit-plane data, which is obtained by subtracting the lower bit-plane data from the block data, form the block data;
  providing a generator polynomial;
  generating redundant code data based on the upper bit-plane data, using the generator polynomial;
  forming encoded lower bit-plane data, in which the redundant code data is embedded; and
  creating encoded block data, in which the encoded lower bit-plane data and the upper bit-plane data are combined;
  checking validity of the redundant code data;
  forming decoded lower bit-plane data, from which the redundant code data is extracted; and
  creating decoded block data, in which the decoded lower bit-plane data and the upper bit-plane data are combined.

63. The medium of claim 62, wherein the method further comprises the steps of:
  generating a random number sequence; and
  arranging the redundant code data according to the random number sequence.

64. The medium of claim 62, wherein the method further comprises the step of correcting invalid block data based on the result of the validity checking step.

* * * * *